April 26, 1949.  W. L. SORENSON  2,468,276
APPARATUS FOR HARVESTING VEGETABLES
Filed July 26, 1945  6 Sheets-Sheet 1

INVENTOR
W. L. Sorenson
BY John A. Seifert
ATTORNEY

April 26, 1949.  W. L. SORENSON  2,468,276
APPARATUS FOR HARVESTING VEGETABLES
Filed July 26, 1945  6 Sheets-Sheet 2
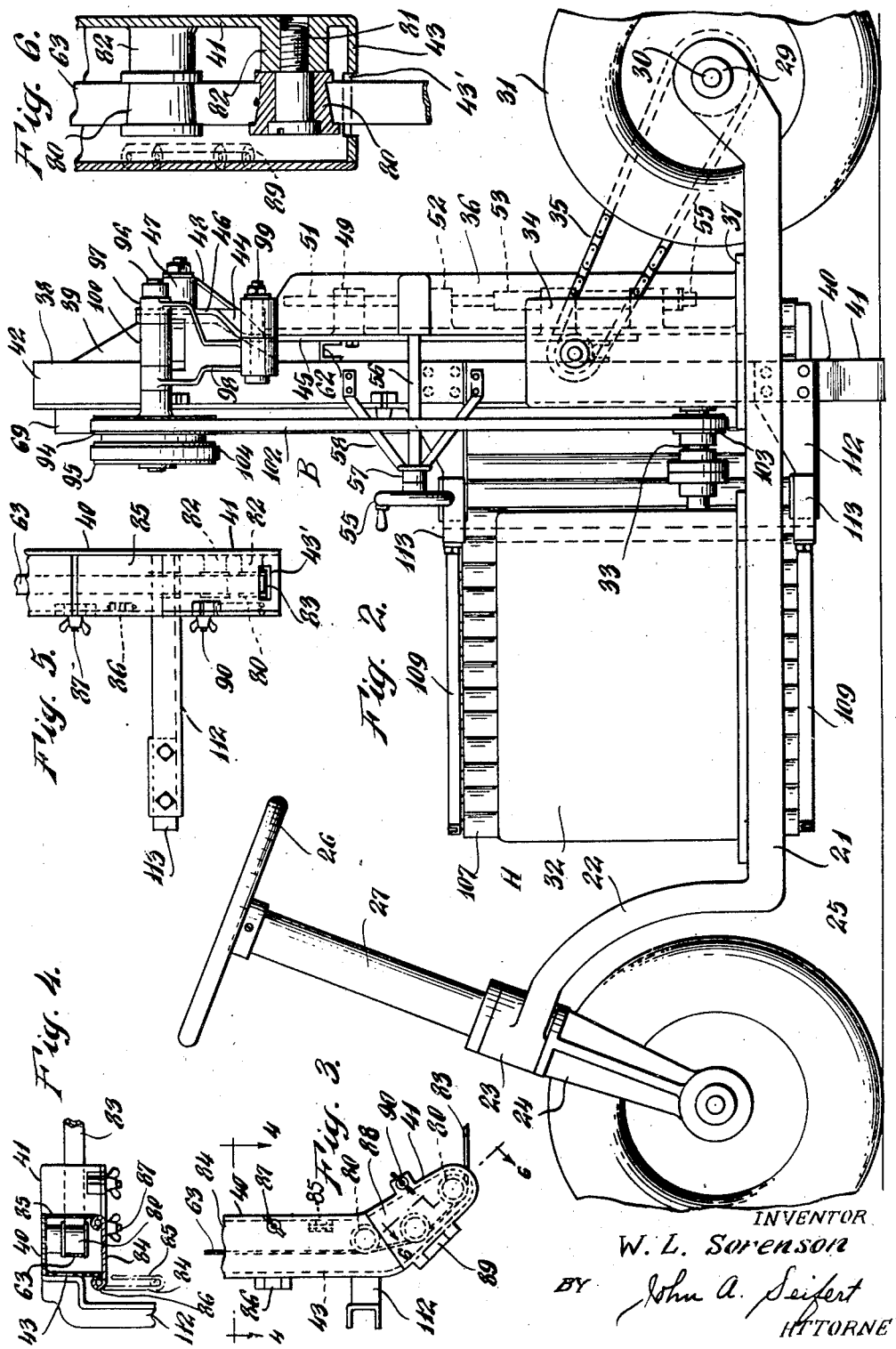
INVENTOR
W. L. Sorenson
BY John A. Seifert
ATTORNEY

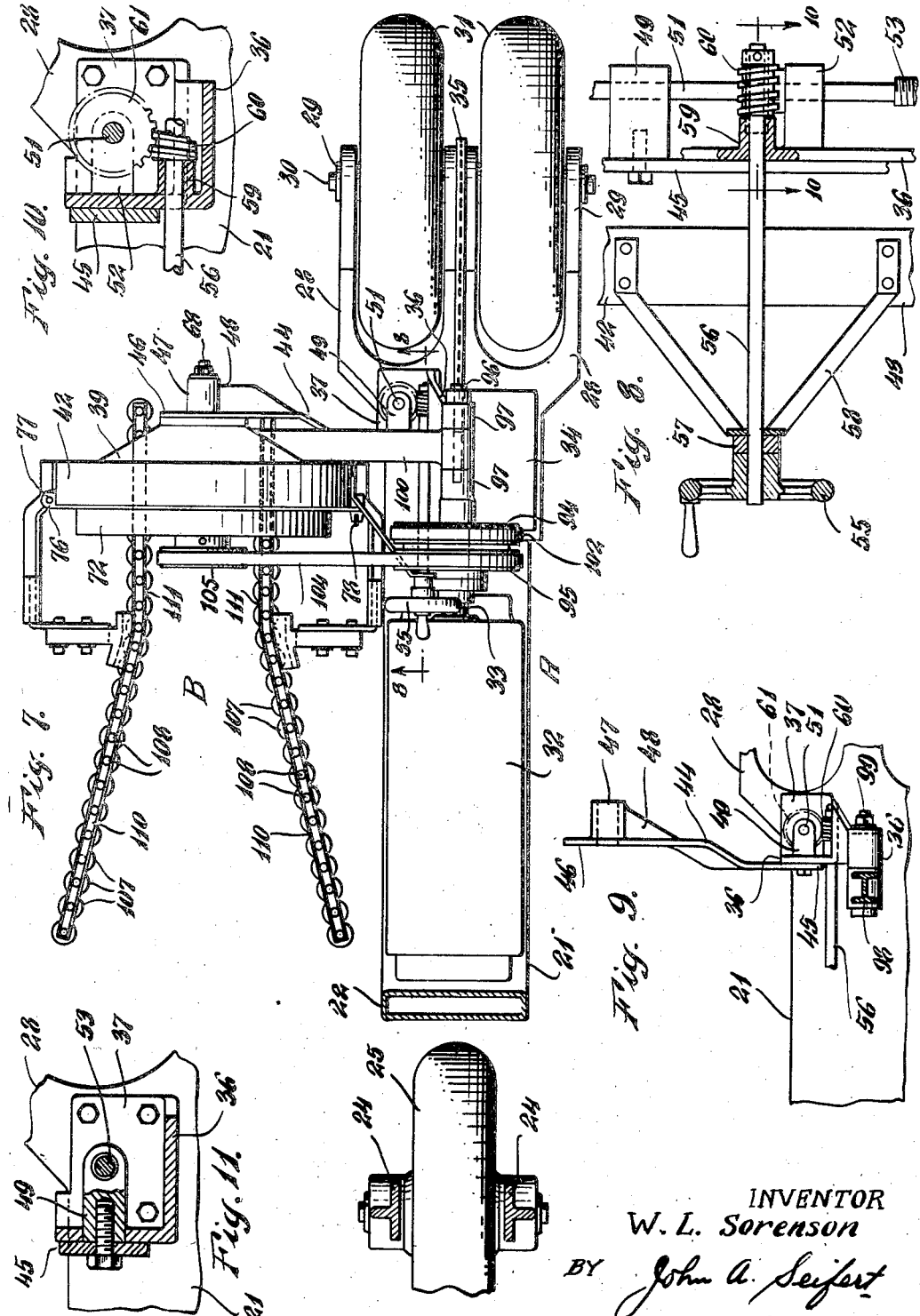

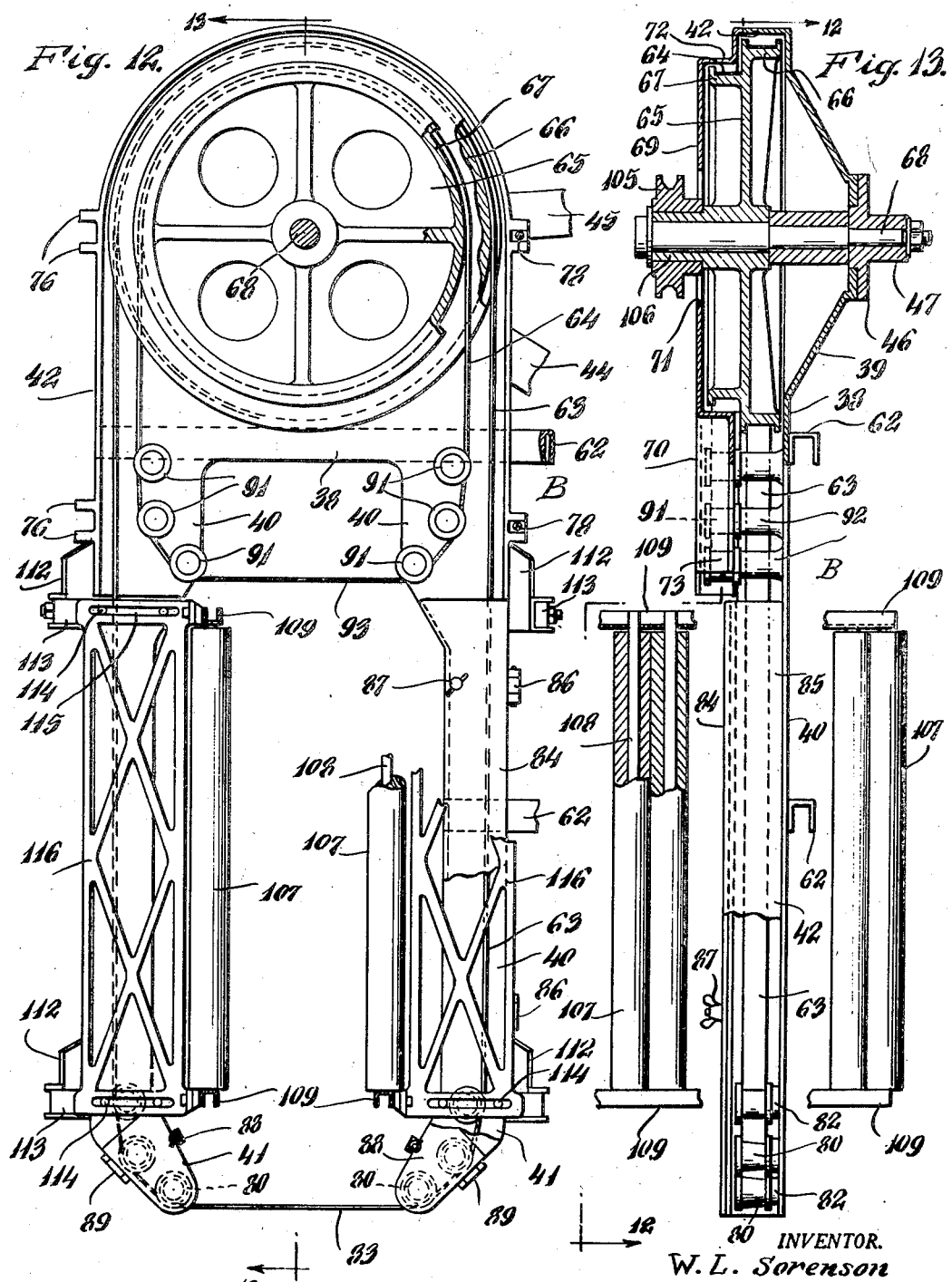

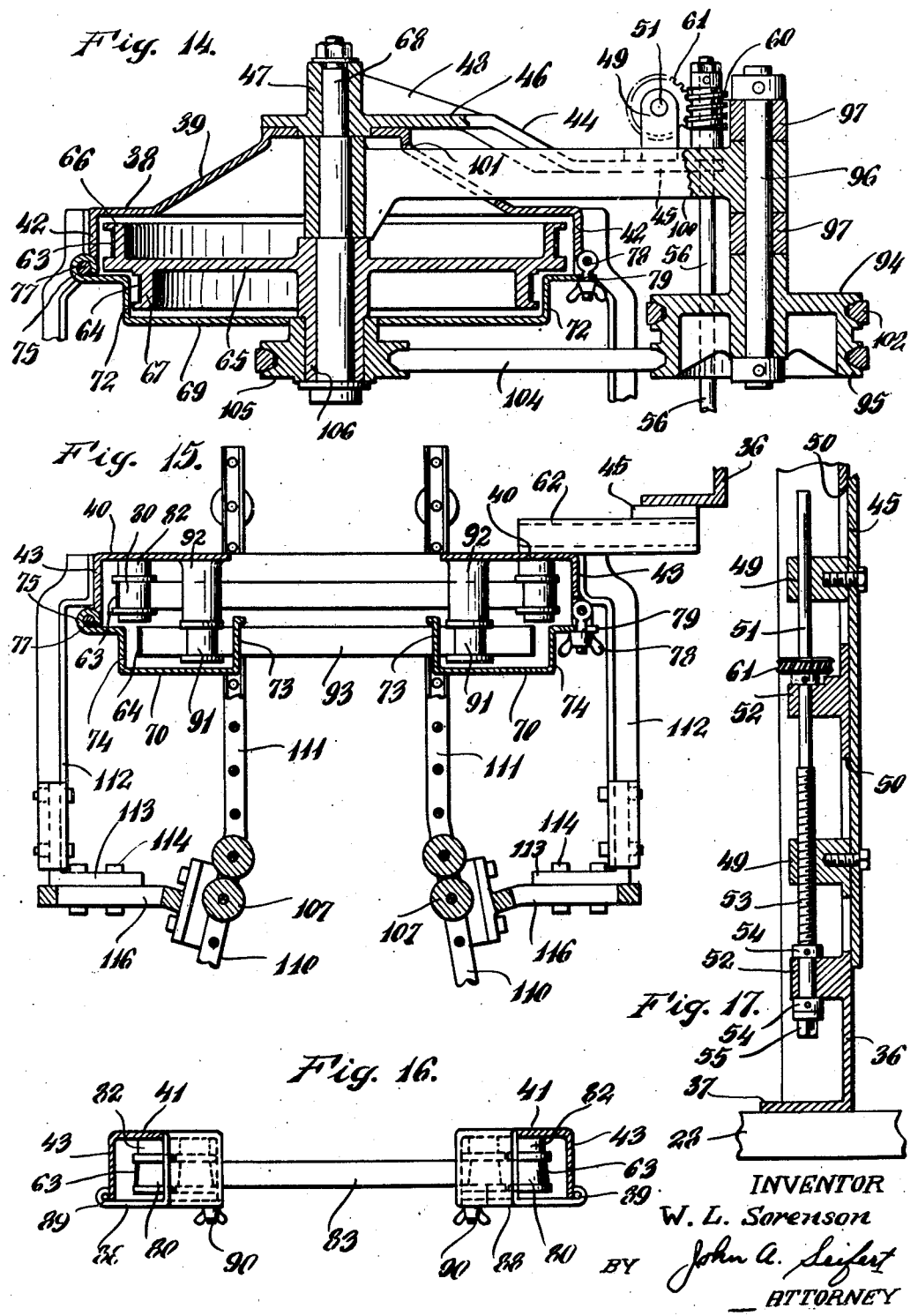

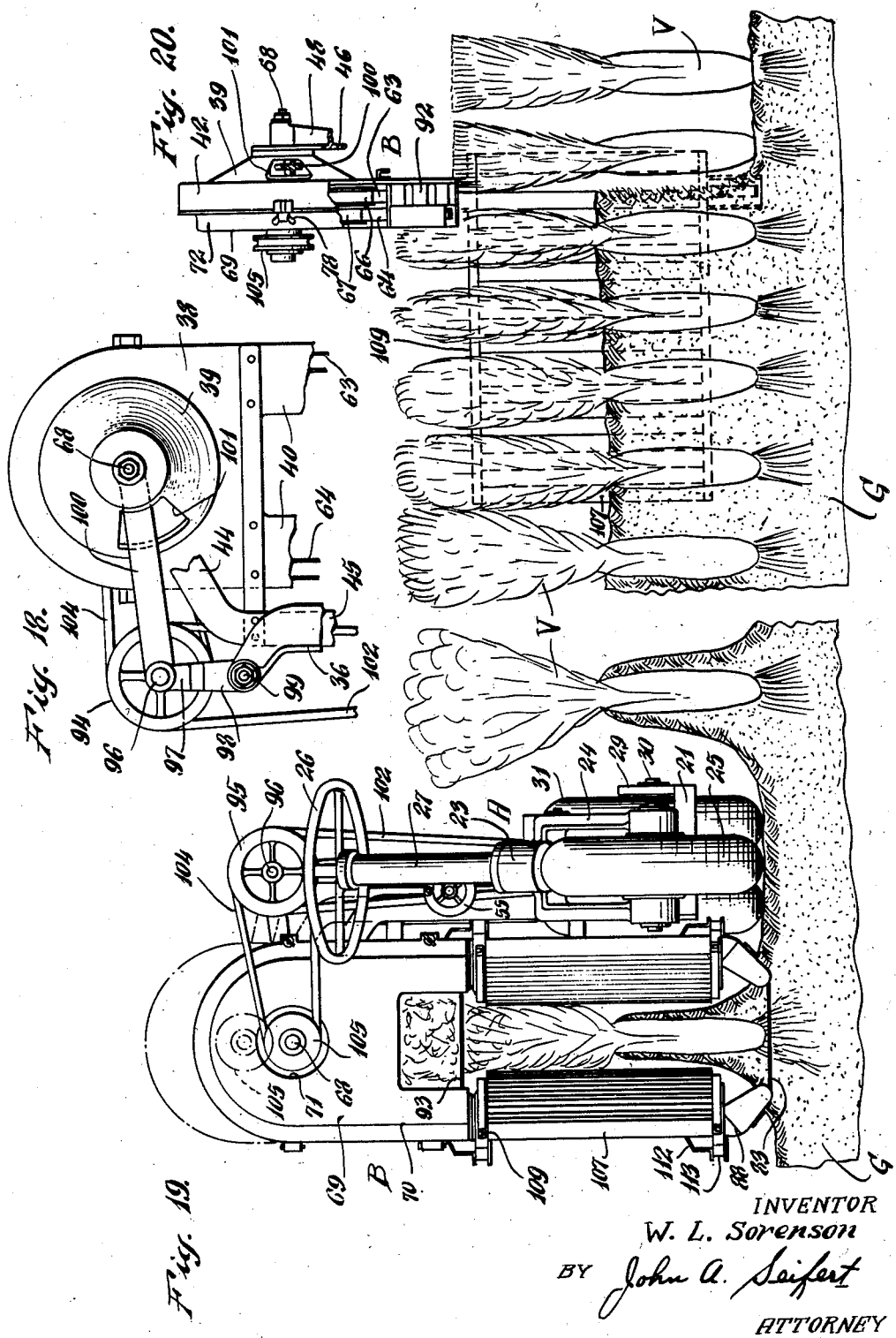

Patented Apr. 26, 1949

2,468,276

UNITED STATES PATENT OFFICE 2,468,276

APPARATUS FOR HARVESTING VEGETABLES

Wendell L. Sorenson, Great Neck, N. Y.

Application July 26, 1945, Serial No. 607,137

9 Claims. (Cl. 55—107)

This invention relates to agricultural apparatus for harvesting vegetables, such as broccoli, cabbage, cauliflower, celery, kale, spinach and Swiss chard, comprising a tractor section having power means and adapted to travel between rows of vegetables, and a cutter section or sections carried by the tractor section and arranged with cutter means to extend transversely of a row of vegetables on a side or on both sides of the tractor section and adapted to cut the vegetables at predetermined portions thereof depending on the type of vegetable being harvested.

It is an object of the invention to provide a harvesting apparatus of this character which is of light weight so that said apparatus may readily be operated on loose or boggy soil in which some of the vegetables are raised without the apparatus bogging in said soil.

It is another object of the invention to provide cutter means which will not become clogged with the soil.

It is a further object of the invention to provide adjustable cutter means to accommodate the apparatus for harvesting crops of different types of vegetables.

Another object of the invention is to mount a cutter whereby it will readily enter the soil and cut the vegetables at the root portion thereof.

Another object of the invention is to provide a pair of cutter means to cut the vegetables at the root and top portions thereof.

A further object of the invention is to provide the cutter section with means to guide and compress the vegetables relative to the cutter means to facilitate the cutting of said vegetables.

It is a still further object of the invention to provide a tractor section comprising a frame supported by steering and driving wheels and carrying power means operatively connected to the driving wheels to drive the same, a cutter section comprising a U-shaped frame adjustably mounted on the tractor section frame to extend from a side or both sides of the tractor section and straddle a row or rows of vegetables, a pair of endless band cutters operatively supported by the U-shaped frame of the cutter section, one of said band cutters having a portion traveling across the space between the free ends of the leg portions of the U-shaped frame to cut the vegetables at the root portion and the other band cutter having a portion traveling across the space between the leg portions adjacent to the connecting portion of the U-shaped frame to cut the top portion of the vegetables and a row of rollers rotatably supported by the leg portions of the U-shaped frame to guide and compress the vegetables relative to the cutting portions of the band cutters, and means to transmit the power of the power means of the tractor section to the band cutters.

Other objects and advantages of the invention will be hereinafter pointed out in the detailed description of the invention.

In the drawings accompanying and forming a part of this application,

Figure 2 is a side elevational view, on a reduced scale, of the apparatus looking at the right hand side of Figure 1 with a steering wheel of the tractor section shown.

Figure 3 is a fragmentary view in front elevation of the free end section of a leg portion of the U-shaped frame of the cutter section to show the guiding of the cutting portion of the band cutter for cutting the vegetables at the root portion.

Figure 4 is a sectional view taken on the line 4—4 of Figure 3 looking in the direction of the arrows.

Figure 5 is a side elevational view of the structure shown in Figure 3 looking at the right hand side of Figure 3.

Figure 6 is a sectional view, on an enlarged scale, taken on the line 6—6 of Figure 3 looking in the direction of the arrows.

Figure 7 is a view looking at the top of Figure 2 with the steering wheel supporting portion of the tractor section in section.

Figure 8 is a sectional view, on an enlarged scale, taken on the line 8—8 of Figure 7 looking in the direction of the arrows to show means for adjusting the U-shaped frame of the cutter section.

Figure 9 is a fragmentary plan view of a portion of the frame of the tractor section showing an arm for supporting the U-shaped frame of the cutter section from the frame of the tractor section and a support in section for power transmitting means.

Figure 10 is a sectional view taken on the line 10—10 of Figure 8 looking in the direction of the arrows.

Figure 11 is a sectional view, on an enlarged scale, taken on the line 11—11 of Figure 1 looking in the direction of the arrows.

Figure 12 is a front elevational view looking substantially from the line 12—12 of Figure 13 in the direction of the arrows of the U-shaped frame of the cutter section with a dust protecting cover removed from the upper portion of said frame and a portion of a drum for supporting the band cutters in section and rails for supporting the rows of vegetable guiding and compressing rollers in section to show frames for mounting said rails on the leg portions of the U-shaped frame with a portion of one of said frames broken away to show a dust protecting cover for the leg portions of the U-shaped frame and an intermediate portion of said cover broken away.

Figure 1:
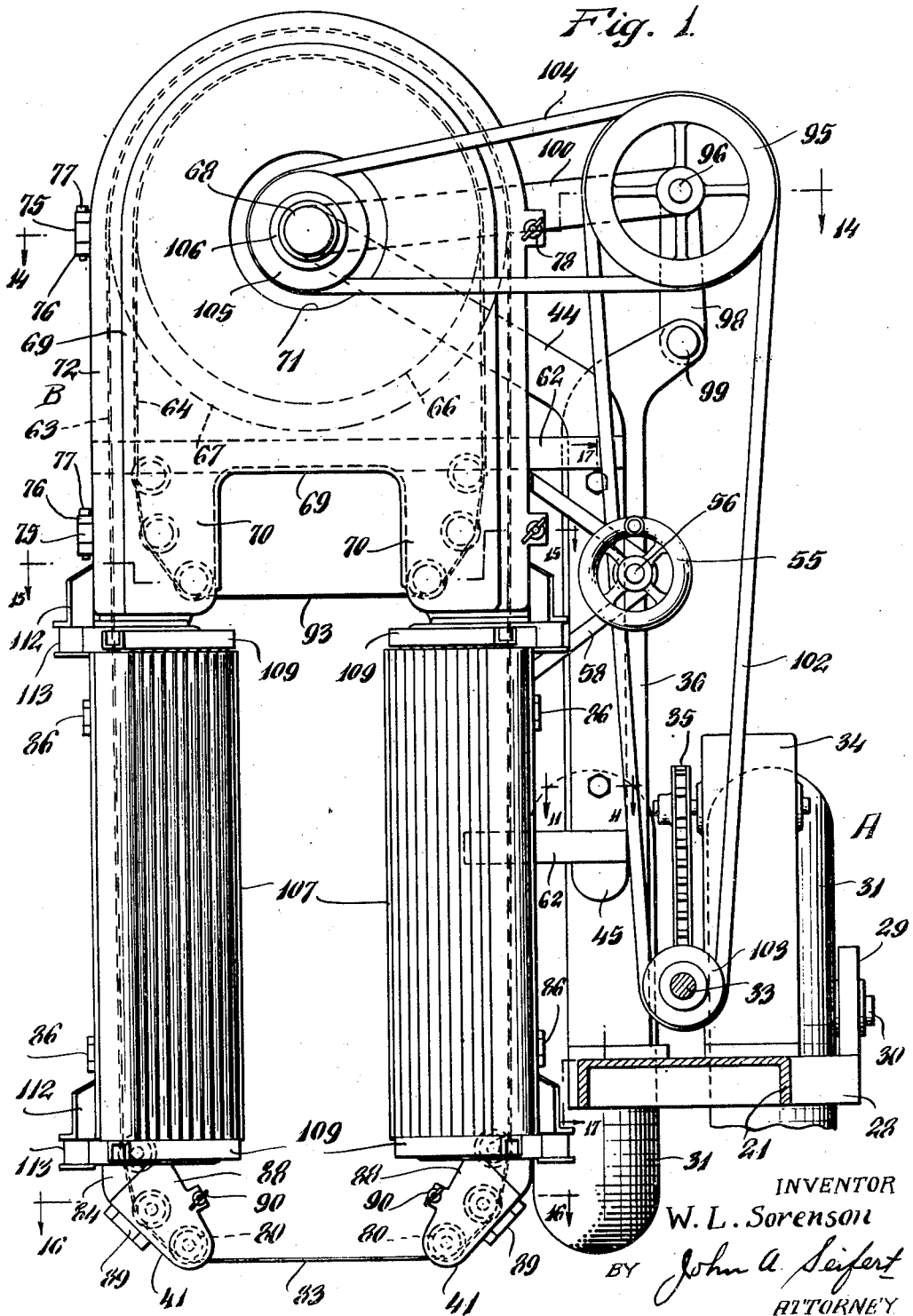
Figure 1 is a front elevational view of the apparatus forming the embodiment of the invention with the front portion of the tractor section in cross section.

Figure 13 is a sectional view taken on the line 13—13 of Figure 12 looking in the direction of the arrows with a portion of the vegetables guiding and compressing rollers in section to show the structure and mounting of the same.

Figure 14 is a cross sectional view, on an enlarged scale, of the upper portion of Figure 1 taken on the line 14—14 of Figure 1 looking in the direction of the arrows to show the drum, the power transmitting means and the adjusting means for the U-shaped frame.

Figure 15 is a cross sectional view, on an enlarged scale, taken on the line 15—15 of Figure 1 looking in the direction of the arrows to show the mounting of the lower portion of the band cutters and the mounting of the vegetable guiding and compressing rollers.

Figure 16 is a cross sectional view, on an enlarged scale, taken on the line 16—16 of Figure 1 looking in the direction of the arrows to show the mounting of the lower portion of the band cutter for cutting the vegetables at the root portion.

Figure 17 is a longitudinal sectional view taken on the line 17—17 of Figure 1 looking in the direction of the arrows to show the adjustable mounting of the U-shaped frame of the cutter section on the frame of the tractor section.

Figure 18 is a rear view, on a reduced scale, of the upper portion of Figure 1 to show a pivotal connection of the support for the power transmitting means with the axis of the drum for the band cutters.

Figure 19 is a complete front elevational view of the apparatus shown in operative position relative to rows of celery and showing in dot and dash lines an adjusted position of the cutter section.

Figure 20 is a side elevational view of a row of celery showing in broken lines the relative position of guiding and compressing rollers and the band cutters for cutting the root and top portions of the celery and showing in full lines the upper portion of the apparatus.

The embodiment of the invention is shown in connection with the harvesting of celery, but it is to be understood that the apparatus is adapted to harvest similar types of vegetables, such as broccoli, cabbage, cauliflower, kale, spinach and Swiss chard. The apparatus forming the embodiment of the invention comprises a tractor section, designated in a general way by A, and a cutter section, designated in a general way by B, the cutter section being shown as a single unit mounted at a side of the tractor section, but the cutter section may be of two units with each unit mounted at a side of the tractor section. The tractor section is adapted to travel between the rows of vegetables with the cutter section or cutter sections extending transversely or straddling a row of vegetables on one side or both sides of the tractor section.

The tractor section includes a frame having a straight body portion 21 terminating at the front end in an upwardly extending neck portion 22 arranged with a tubular head or bearing 23 for rotatably supporting a fork member 24 rotatably carrying a steering traction wheel 25 and said fork member being actuated to steer the wheel 25 by a hand wheel 26 fixed to a shaft 27 connected to the fork member. The rear end of the frame body portion 21 is of increased width and arranged with a parallel pair of spaced recesses extending inwardly from the rear end to form a double bifurcated portion, as shown at 28 in Figure 7, and the outer end sections of the leg portions of the bifurcations extending in an upward direction and terminating in bearing members, as shown at 29 in Figures 1, 2 and 19, for a rotatable shaft 30 extending transversely of the bifurcations 28. Driving traction wheels 31 are fixedly mounted on the shaft 30 to rotate therewith in the bifurcations 28 and driven from a suitable source of power, such as an internal combustion engine 32 having its output shaft 33 operatively connected to a speed reduction mechanism 34 having its output shaft operatively connected to the shaft 30 by a sprocket chain 35 engaging around sprocket wheels on the output shaft of the speed reduction mechanism and the shaft 30. The engine 32 and speed reduction mechanism 34 are shown in a general way and are mounted on the frame body portion 21, as shown in Figures 2 and 7. A seat for the operator may be arranged in heat insulated relation on the engine so that the operator may readily grasp the hand wheel 26 in sitting position, or the hand wheel may be actuated by the operator walking alongside of the tractor section as the apparatus will travel at a low rate of speed due to the speed reduction mechanism. The driving wheels 31 are spaced apart a minimum distance with the steering wheel 25 in alinement with the space between said driving wheels to afford sufficient support for the tractor and cutter sections while traveling relative to the rows of vegetables, as shown in Figure 19.

The cutter section B is supported by the tractor section A by a standard 36 of angle shape in cross section, as shown in Figure 10, having a flanged bottom secured to the tractor section frame at the juncture of the body portion 21 and a bifurcated portion 28, as shown at 37. If two cutter sections are to be used, another standard 36 will be mounted on the opposite side of the tractor section frame at the juncture of the body portion 21 and the other bifurcated portion 28.

The cutter section B includes a U-shaped frame having a connecting plate portion 38 arranged with a central conical recess 39 projecting from the rear face of the connecting plate portion and leg portions 40 depending from opposite sides of the connecting portion 38 and having the free end section extending inwardly toward each other, as shown at 41. The outer free edge of the connecting portion 38 is flanged outwardly from the front face, as shown at 42 in Figures 12, 13 and 14, and the outer longitudinal edge of the leg portions 40, 41 are flanged outwardly from the front faces, as shown at 43 in Figures 3 to 6, inclusive, 15 and 16.

The U-shaped frame is adjustably mounted on the standard 36 to position the inwardly extending section 41 toward and away from the ground, as indicated at G in Figures 19 and 20, to cut different portions of vegetables V or to cut different types of vegetables, as will hereinafter be more fully disclosed. This adjustable mounting is accomplished by providing an arm in the form of an angle member consisting of a side portion having an intermediate section 44 bent obliquely to the plane of the other side portion 45, as shown in Figures 9 and 14, and the free end section of the first side portion bent to extend in a plane parallel to the plane of the side portion 45, as shown at 46, and arranged with a boss 47 reinforced by a rib 48. The side portion 45 is slidably mounted on the standard 36, as shown in Figures 8, 10, 11, and 17, by securing blocks 49 to the inner face of the portion 45 and said blocks 49 slidably engaged in elongated openings 50 spaced from each other in a wall of the standard 36 with the upper block slidable on a smooth surfaced portion 51 at the upper end of a shaft rotatably mounted in bearings 52 projecting from the inner face of the wall arranged with the openings 50 of the standard 36. An intermediate portion of said shaft is screw threaded, as shown at 53, and operatively engaged in the lower block 49 and the lower end portion of the shaft is rotatably mounted in the lower bearing 52 of the standard 36 and retained in said bearing against longitudinal movement by collars 54 secured to the shaft in abutting relation with the opposite ends of the bearings, as shown in Figure 17, whereby rotation of the shaft will impart reciprocation to the arm 44—48. The shaft 51, 53 is either actuated by a suitable tool, such as a wrench, applied to a head 55 on the end of the shaft extending from the lower collar 54, or by a hand wheel 55 fixed on an end of a shaft 56 rotatably supported at the end portion adjacent to the hand wheel by a bearing 57 carried by a bracket 58 mounted on the flange portions 42 and 43 of the frame 38—43. The opposite end portion of the shaft 56 is rotatably supported in a bearing 59 arranged as a boss extending from the inner face of the wall arranged with the openings 50 of the standard 36, as shown in Figures 8 and 10, and said end of the shaft 56 is operatively connected to the shaft portion 51 by a worm 60 fixed on the shaft 56 meshing with a gear 61 fixed on the shaft portion 51, whereby actuation of the hand wheel 55 will impart rotation to the shaft 51, 53 and reciprocation to the arm 44—48 and actuate the cutter section frame 38—43 in a vertical plane. To reinforce the connection between the arm 44—48 and the frame 38—43, there are provided braces 62, as shown in Figures 1, 2, 12, 13 and 15, of any suitable form fixed at the opposite ends to the arm side portion 45 and the rear faces of the connecting portion 38 and the adjacent leg portion 40.

The cutter section frame 38—43 is adapted to operatively support cutter means to cut various types of vegetables, and said cutter means shown in the present illustration of the invention is particularly adapted for harvesting celery and other similar vegetables where it is desired to sever the vegetables from their roots and also top the vegetables. This cutter means comprises a pair of endless band cutters 63, 64, the cutter 63 being of greater circumference to travel in a path extending around the connecting portion 38, downwardly along one of the leg portions 40, across the space between the inwardly extending end sections 41 of said leg portions and upwardly along the other leg portion 40 to the connecting portion 38. The other band cutter 64 is of less circumference to travel within the path of travel of the band cutter 63 and in a path extending around the connecting portion 38, downwardly a short distance along one of the leg portions 40, across the space between the leg portions 40 adjacent the connecting portion 38 and upwardly along the other leg portion 40 to the connecting portion 38. The portions of both band cutters traveling relative to the connecting portion 38 are supported by a drum 65 having two flanges 66, 67 of different diameters, the flange 66 of larger diameter being adapted to support the band cutter 63 and the flange 67 of smaller diameter being adapted to support the band cutter 64. The drum 65 is rotatably supported on a stud shaft 68 fixedly mounted at one end in the boss 47 of the supporting arm 44—48, as shown in Figures 13 and 14. The flange 66 rotates within the angle formed by the connecting portion 38 and the flange 42, and the drum 65 and flange 67 are enclosed by a dust protecting cover having a portion 69 corresponding to the connecting portion 38 and depending leg portions 70 corresponding to the section of the leg portions 40 adjacent to the connecting portion 38. The cover portion 69 has a center opening 71 for the passage of the stud shaft 68 and the outer marginal section of said portion 69 is first bent perpendicularly from the inner face and then bent laterally to form an L portion, as shown at 72 in Figures 13 and 14. The inner edge section of the cover leg portions 70 is bent perpendicularly from the inner face, as at 73 in Figure 15, and the outer edge section of said leg portions is bent to L shape, as shown at 74. The cover 69—74 is pivotally mounted on the flange 42 at a side of the connecting portion 38 and on the flange 43 of one of the leg portions 40 by a knuckle 75 arranged on the L-shaped edge portions 72 and 74 and engaged between a pair of perforated ears 76 arranged on the flanges 42 and 43 with a pintle 77 engaged in said knuckle and ears, as shown in Figures 1, 12, 14 and 15. The cover 69—74 is releasably secured in closed position by a pair of latches 78 comprising a member pivotally mounted on portions of the flanges 42, 43 opposite the portions of the flanges 42, 43 arranged with the ears 76 and having a wing nut screw threaded on said member, and said latch 78 engaging a recess 79 in a projection of the corresponding portion of the laterally extending section of the L-shaped edge portions 72 and 74 of the cover portions 69 and 70, respectively, as shown in Figures 1, 12, 14 and 15.

The band cutter 63 extends from the drum flange 66 along the frame leg portions 40 and is supported at the inwardly extending end sections 41 of said leg portions by a series of three rollers 80 on each end section 41, each roller having a pair of spaced flanges and the portion between the flanges of the upper roller being straight and said portion of the two lower rollers being tapered inwardly, as shown in Figures 4, 6, 15 and 16, and all the rollers rotatably mounted on a pin 81 fixed in a boss 82 on the inner face of the leg section 41. The pins 81 are positioned on each leg section 41 to extend in an arc so that the upper roller 80 is furthest from the longitudinal center of the frame 38—43 and the lower roller is nearest said longitudinal center. The band cutter 63 travels in a substantially vertical plane from the drum flange 66 to the upper roller 80 and travels in an inwardly converging path from said upper roller while traveling over the two lower rollers 80 and then travels from the lower roller 80 of one set of three rollers to the lower roller of the other set of rollers across the space between the leg sections 41, as shown at 83. Due to the taper of the two lower rollers 80 of each set of rollers, the width of said portion 83 of the band cutter 63 will extend in a downwardly direction with the forward edge of said portion lowermost to facilitate said portion 83 to enter the soil and cut the vegetables at the root portion thereof, as shown in Figures 19 and 20. The portions of the band cutter 63 traveling along the leg portions 40—43 of the cutter section frame is enclosed in said portions by two pairs of covers pivotally mounted on the leg portions 40 and end sections 41, one pair of covers comprising hingedly connected sections 84, 85, section 84 being pivotally mounted on the flange 43 of the leg portion 40 by hinges 86 similar to the hinges 76—77 and said sections 84, 85 being releasably secured in cutter enclosing position by a latch 87 in the form of a bolt engaged in the cover section 84 and the leg portion 41 and a wing nut screw threaded on said bolt. The hinge connection between the cover sections 84 and 85 permits the cover sections to be folded upon each other in the open position of said cover, as shown in dot and dash lines in Figure 4, whereby the cutter is readily accessible. The other pair of dust covers consist of a member 88 of angle shape in cross section and conforming to the longitudinal contour of the end sections 41 and having one side portion pivotally mounted on the flange 43 of the section 41 by a hinge 89 and the other side portion engaging the free side edge of the end section 41, as shown in Figure 16. The covers 88 are releasably secured in closed position by a latch 90 similar to the latches 87 mounted on a lateral projection of the end section 41 and adapted to engage a recess in a lateral projection at the juncture of the angle portion of the covers 88, as shown in Figures 1 and 3. The flanges 43 of the leg sections 41 are extended to the bottom of said sections and arranged with an opening 43' for the passage of the band cutter 63, as shown in Figure 6.

The band cutter 64 travels from the drum flange 67 until it reaches the junctures between the connecting portion 38 and leg portions 40 where it is engaged by two sets of three rollers 91, each roller being rotatably mounted on a pin similar to the pin 81 fixed in a boss 92 on the inner face of the leg portions 40 adjacent to the connecting portion 38. The rollers 91 of each set are arranged in an arcuate line similar to the rollers 80 so that the travel of the band cutter 64 will converge from the vertical path of travel to a horizontal path of travel extending across the space between the leg portions 40, and said horizontal path of travel, as indicated at 93, is adapted to cut the top portion of the vegetables, such as the leaves or foliage of celery.

As shown in the drawings, the cutting portion 93 of the band cutter 64 will cut the foliage of the celery prior to the cutting of the celery at the root portion by the cutting portion 83 of the band cutter 63. The drum flanges 66 and 67, and the rollers 80 and 91 may be arranged so that the band cutters 63 and 64 travel in the same vertical plane to simultaneously cut the celery at the root and foliage portions, or the drum flange 67 and rollers 91 may extend in a vertical plane rearwardly of the vertical plane in which the drum flange 66 and rollers 80 extend so that the root portion is cut prior to the cutting of the foliage portion of the celery.

The adjustment of the frame 38—43 by the rotation of the shaft 51, 53 will adjust the cutting portions 83 and 93 of the band cutters 63 and 64, respectively, relative to the vegetables, so that different portions of the vegetables or different types of vegetables may be cut.

The band cutters 63 and 64 are simultaneously actuated to continuously travel in their predetermined paths from the engine 32 through power transmitting means comprising a pulley having a double grooved rim, as indicated at 94 and 95 in Figures 2, 7 and 14, and rotatably mounted on an end portion of a stud shaft 96 fixed in bosses of a bifurcated end 97 of an arm 98 rotatably mounted on a stud 99 fixed in a laterally extending end of the standard 36. The pivotal or rotatable mounting of the arm 98 will permit the pulley 94, 95 to participate in the adjustment of the frame 38—43 on the standard 36 and said adjustment of the frame will be imparted to the pulley through a link 100 rotatably engaged at one end on the shaft 96 between the bifurcation 97 and rotatably mounted at the opposite end on a portion of the shaft 68 between the boss 47 and the hub of drum 65, as shown in Figures 14 and 18, and the link 100 extending through an elongated opening 101 in the wall of the conical recess 39. The pulley 94, 95 is directly driven from the engine 32 through an endless belt 102 engaged around a pulley 103 on the output shaft 33 and the pulley groove 94 and the rotation of the pulley 94, 95 is transmitted to the drum 65 through an endless belt 104 engaged around the pulley groove 95 and a pulley 105 fixed on an extended hub portion 106 of the drum 65. The direct driving connection between the engine 32 and drum 65 will actuate the band cutters 63 and 64 at a high rate of speed in comparison with the low rate of travel of the tractor section. The band cutters 63 and 64 will present a very thin cutting edge which will readily and cleanly cut the vegetables.

To facilitate the cutting of the vegetables by the cutting portions 83 and 93 of the band cutters 63 and 64, respectively, the vegetables are guided and compressed relative to said cutting portions by spaced rows of guiding and compressing members comprising a series of rollers 107 rotatably supported on equidistantly spaced shafts 108 mounted at the opposite end portions in openings in the bottom wall of a pair of channel rails 109 having an end portion extending in a diverging direction, as shown at 110 in Figures 7 and 15, and the opposite end portion extending in a straight or parallel direction, as shown at 111. The rotatable mounting of the rollers 107 will reduce the friction between the top portion of the vegetables and said rollers and reduce the amount of drag on the tractor. The rails are mounted on the cutter frame 38—43 to have the diverging portions 110 extend forwardly of the cutting portions 83 and 93 and the parallel portions 111 extend relative to said cutting portions by brackets comprising two pairs of arms 112 fixed at one end to the flanges 43 at the opposite ends of the leg portions 40 and angle members 113 mounted at a side portion on the free end portions of the arms 112 and the other side portion of the angle members carrying bolts 114 to engage elongated slots 115 in the top and bottom portions of frame members 116 supporting the rails 109. The bolts 114 and slots 115 permit adjustment of the rollers 107 toward and away from each other to accommodate vegetables of different dimensions. The slots 115 may be of greater width than the diameter of the bolts 114 to permit canting of the frame members 116 and adjustment of the rows of rollers 107 to have the rows diverge from the top toward the bottom or from the bottom toward the top to accommodate vegetables of different longitudinal contour.

The cutter section may be readily attached to a standard type of tractor without departing from the scope of the invention where the soil can support such a tractor.

The number of cutter bands may be more than two when it is desired to cut the vegetables being harvested into a plurality of parts.

The apparatus is also suitable for harvesting grain and sugar cane.

Having thus described my invention, I claim:

1. In apparatus for harvesting vegetables, a frame, an endless band cutter operatively supported by the frame with a portion traveling in a plane transversely of a row of vegetables to cut the vegetables at the root portion thereof, and a second endless band cutter operatively supported by the frame and having a portion traveling in a plane parallelly of the transversely traveling portion of the first band cutter to cut the top portion of the vegetables.

2. In apparatus for harvesting vegetables, a frame, an endless band cutter operatively supported by the frame with a portion traveling in a plane transversely of a row of vegetables to cut the vegetables at the root portion thereof, a second endless band cutter operatively supported by the frame and having a portion traveling parallelly of the transversely traveling portion of the first band cutter to cut the top portion of the vegetables, and power means operatively connected to and simultaneously actuating both band cutters.

3. In apparatus for harvesting vegetables, a frame, an endless band cutter operatively supported by the frame with a portion traveling in a path transversely of a row of vegetables to cut the vegetables, and spaced rows of guide members comprising a pair of frame members adjustably mounted on the frame to have adjustment toward and away from one another and in angular relation to the frame, and a series of rollers rotatably supported on the frame members to participate in the adjustments of the frame members whereby the rows of rollers are adjusted toward and away from one another and in angular relation with one another to accommodate different shape and size vegetables.

4. In apparatus for harvesting vegetables, a U-shaped frame, a drum rotatably mounted on the connecting portion of the frame, a series of supporting guide rollers rotatably mounted on the free end sections of the leg portions of the frame and tapered inwardly toward the leg sections, and an endless band cutter passing over the drum and rollers with a portion extending across the space between the leg portions to cut the vegetables extending into the space between the leg portions of the frame and the width of said latter portion of the band cutter being positioned by the taper of the rollers to extend in an inclined direction toward the ground to facilitate the entering of the band cutter into the ground.

5. In apparatus for harvesting vegetables, a U-shaped frame, a drum having a pair of flanges of different diameters and rotatably mounted on the connecting portion of the frame, a series of supporting guide rollers rotatably mounted on the free end sections of the leg portions of the frame in the plane of the drum flange of larger diameter, a second series of supporting rollers rotatably mounted on the leg portions adjacent to the connecting portion of the frame in the plane of the drum flange of smaller diameter, an endless band cutter passing around the drum flange of larger diameter and the first series of supporting rollers with a portion spanning the space between the free ends of the leg portions of the frame to cut the vegetables at the root portion thereof, and a second endless band cutter passing around the drum flange of smaller diameter and the second series of rollers with a portion spanning the space between the leg portions adjacent to the connecting portion of the frame to cut the top portion of the vegetables.

6. In apparatus for harvesting vegetables, a U-shaped frame, an endless band cutter operatively supported by said U-shaped frame with a portion travelling across the space between the free ends of the leg portions of the U-shaped frame to cut vegetables at the root portion thereof, a second endless band cutter operatively supported by the U-shaped frame with a portion traveling across the space between the leg portion and adjacent to the connecting portion of the U-shaped frame to cut the top portion of the vegetables, and a row of members adjustably mounted on each leg portion of the U-shaped frame between the cutting portions of the band cutters to guide and compress the vegetables relative to said cutting portions.

7. In apparatus for harvesting vegetables, a tractor section comprising a frame supported by steering and driving wheels, power means mounted on said frame and operatively connected to the driving wheels to drive the same and a standard supported by the frame of the tractor section, a cutter section comprising an angle arm having a side portion slidably mounted on the standard, a U-shaped frame mounted on the other side portion of the angle arm whereby said U-shaped frame is adjustably supported by the standard of the tractor section, a drum rotatably mounted on the connecting portion of the U-shaped frame of the cutter section, a series of rollers rotatably mounted on the free end section of the leg portions of the U-shaped frame, an endless band cutter passing around the drum and rollers with a portion extending across the space between the leg portions of the U-shaped frame to cut vegetables extending into said space between the leg portions, the sliding adjustment of the arm of the cutter section on the standard of the tractor section varying the position of the cutting portion of the band cutter relative to the height of the vegetables, and a driving connection between the power means of the tractor section and the drum of the cutter section comprising an arm pivotally mounted on the standard and pivotally connected to the axis of said drum to participate in the adjustment of the U-shaped frame and a pulley rotatably supported by said arm and operatively connected with the power means of the tractor section and the drum of the cutter section.

8. In apparatus for harvesting vegetables as claimed in claim 7, means carried by the standard of the tractor section and operatively connected to the arm of the cutter section to impart adjustment to said arm.

9. In apparatus for harvesting vegetables, a tractor section comprising a frame supported by steering and driving wheels and power means carried by said frame and operatively connected to the driving wheels to drive the same, a cutter section comprising a U-shaped frame supported by the frame of the tractor section to extend at a side of the tractor section with the U-shaped frame straddling a row of vegetables and the steering and driving wheels of the tractor section engaging the ground at a side of said row of vegetables, a pair of endless band cutters operatively supported by the U-shaped frame of the cutter section, one of said band cutters having a portion traveling across the space between the free ends of the leg portions of the U-shaped frame to cut the vegetables at the root portion and the other band cutter having a portion traveling across the space between the leg portions adjacent to the connecting portion of the U-shaped frame to cut the top portion of the vegetables and a row of members adjustably mounted on the leg portions of the U-shaped frame between the cutting portions of the endless band cutters to guide and compress the vegetables relative to said cutting portions, and means to transmit the power of the power means to the endless band cutters.

WENDELL L. SORENSON.

REFERENCES CITED

The following references are of record in the file of this patent:

UNITED STATES PATENTS

| Number | Name | Date |
| --- | --- | --- |
| 740,633 | Downing | Oct. 6, 1903 |
| 788,745 | Yale | May 2, 1905 |
| 1,039,161 | Maurer | Sept. 24, 1912 |
| 1,748,746 | Zuckerman | Feb. 25, 1930 |
| 1,768,195 | Driscoll | June 24, 1930 |
| 2,281,904 | Wurtele | May 5, 1942 |
| 2,308,392 | Roepke | Jan. 13, 1943 |
| 2,337,355 | Spell | Dec. 21, 1943 |
| 2,436,831 | Silva | Mar. 2, 1948 |

FOREIGN PATENTS

| Number | Country | Date |
| --- | --- | --- |
| 37,606 | Denmark | June 9, 1927 |
| 669 | Great Britain | 1877 |